(12) United States Patent
Kimura

(10) Patent No.: US 8,192,031 B2
(45) Date of Patent: Jun. 5, 2012

(54) PROJECTION TYPE DISPLAY APPARATUS FOR DISPLAYING AN IMAGE

(75) Inventor: Nobuyuki Kimura, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 442 days.

(21) Appl. No.: 12/421,733

(22) Filed: Apr. 10, 2009

(65) Prior Publication Data

US 2010/0073640 A1 Mar. 25, 2010

(30) Foreign Application Priority Data

Sep. 25, 2008 (JP) ................................. 2008-246124

(51) Int. Cl.
*G03B 21/28* (2006.01)
(52) U.S. Cl. .......................................... 353/97; 359/233
(58) Field of Classification Search .............. 353/89–97, 353/38; 362/268; 359/233
See application file for complete search history.

(56) References Cited

FOREIGN PATENT DOCUMENTS

| JP | 2005-017500 | 1/2005 |
|---|---|---|
| JP | 2005-031103 | 2/2005 |
| JP | 2005-031103 | * 3/2005 |
| JP | 2007-279332 | * 10/2007 |
| WO | WO 03/032080 A1 | 4/2003 |

OTHER PUBLICATIONS

Machine translation of 2007-27332.*
Machine translation of 2005-031103.*

* cited by examiner

*Primary Examiner* — Que T Le
*Assistant Examiner* — Jerry Brooks
(74) *Attorney, Agent, or Firm* — Antonelli, Terry, Stout & Kraus, LLP.

(57) ABSTRACT

The present invention provides a projection type display apparatus for displaying an image by which reduction of contrast is suppressed, including: a light source; a first lens array and a second lens array having a plurality of lens cell areas; a collecting lens; a display element; a projection lens; and a light shielding unit which light-shields the light fluxes from the first lens array to the second lens array, wherein the light shielding unit light-shields at least parts of all the lens cell areas except for the lens cell area in contact with an optical axis among a plurality of rectangular lens cell areas of the second lens array, and a light shielding area in the lens cell area in contact with the optical axis is smaller than that in any of the lens cell areas except for the lens cell area in contact with the optical axis.

8 Claims, 14 Drawing Sheets

LIGHT SOURCE

ENLARGING

THREE ROWS

TWO ROWS — c2

ONE ROW

TWO ROWS — c2

THREE ROWS

TWO ROWS — c2

ONE ROW

TWO ROWS — c2

PROJECTION TYPE DISPLAY APPARATUS FOR DISPLAYING AN IMAGE

BACKGROUND OF THE INVENTION (1) Field of the Invention

The present invention relates to a projection type display apparatus for displaying an image which forms an optical image in accordance with an image signal with an image display element to be projected to a screen or the like.

(2) Description of the Related Arts

In the case where optical modulation by an image display element is executed in order to minimize the illuminance in an optical system of a conventional projector, there occurs a phenomenon so-called reduction of contrast in which light absorbed by an emission polarization plate which aligns polarization of light fluxes modulated by the image display element is not sufficient and the illuminance on a screen is not lowered.

In addition, there is means for improving contrast by decreasing the minimum illuminance of a projection type display apparatus for displaying an image by photochromatic means which changes the amount of light of the entire screen in accordance with a signal from outside, other than light valves. The signal from outside in this case includes an image signal, a signal obtained by measuring the environments of outside, and a signal intentionally operated by a user. As one of the means, a technique using light shielding means which changes the amount of light shielded in accordance with an image signal in an illumination optical system is disclosed in WO2003-032080, Japanese Patent Application Laid-Open No. 2005-17500, and Japanese Patent Application Laid-Open No. 2005-31103.

In the case where a dynamic range of the projection type display apparatus for displaying an image is further increased, it is necessary to further increase even the amount of light shielded by the light shielding means arranged in the illumination optical system. In order to increase the amount of light shielded by the light shielding means, light shielding areas where illumination light fluxes are light-shielded by a light shielding member included in the light shielding means is increased.

However, if the amount of light shielded is increased, the number of secondary light source images superimposed on an illuminated area of the illumination optical system formed by a lens array is decreased, and thus, illuminance distribution in the illuminated area of the illumination light is likely to be nonuniform. In addition, in the case where the light shielding means rotates (turns) or moves light shielding plates to perform light shielding, changes of the illuminance distribution at the time of movement or rotation of the light shielding plates are likely to be displayed on a screen.

SUMMARY OF THE INVENTION

The present invention is to provide a projection type display apparatus for displaying an image which realizes high contrast while uniformly maintaining illuminance distribution in an illuminated area of illumination light and can widely control the amount of light shielded with light shielding means to obtain an image with a large dynamic range.

Specifically, the present invention provides a projection type display apparatus for displaying an image, including: a light source; a first lens array having a plurality of lens cell areas by which emission light emitting from the light source is divided into a plurality of light fluxes; a second lens array having a plurality of lens cell areas through which the emission light fluxes from the first lens array pass; a collecting lens which collects the emission light fluxes from the second lens array; a display element which receives the light fluxes collected by the collecting lens to pass through or reflect; a projection lens which emits the transmission light or the reflected light from the display element; and a light shielding unit which light-shields the light fluxes from the first lens array to the second lens array, wherein the light shielding unit light-shields at least parts of all the lens cell areas except for the lens cell area in contact with an optical axis among a plurality of rectangular lens cell areas of the second lens array, and a light shielding area in the lens cell area in contact with the optical axis is smaller than that in any of the lens cell areas except for the lens cell area in contact with the optical axis.

According to the present invention, it is possible to improve the uniformity of illuminance distribution of an image to be maintained better than before, and to realize the control of the amount of light shielded that enables high contrast. Further, it is possible to provide a projection type display apparatus for displaying an image which can obtain an image with a large dynamic range.

BRIEF DESCRIPTION OF THE DRAWINGS

Embodiments of the present invention will be described in detail based on the following figures, wherein.

DETAILED DESCRIPTION OF THE ILLUSTRATED EMBODIMENT

Figure 1:
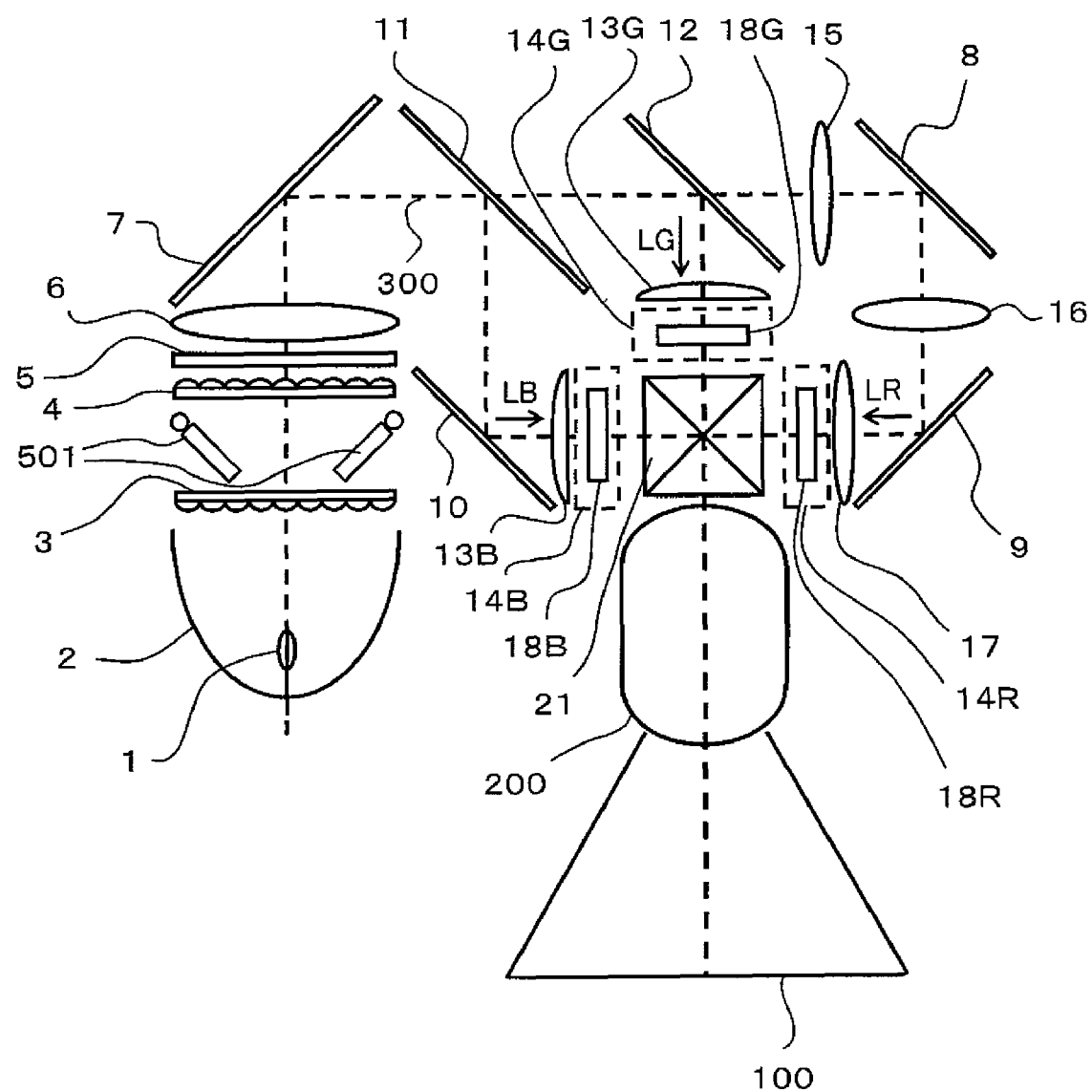
FIG. 1 is a diagram showing an embodiment of an optical system configuration of a projection type display apparatus for displaying an image according to the present invention.

Hereinafter, a preferred embodiment of the present invention will be described in detail with reference to the drawings. In the respective drawings, the same constituent elements are given the same reference numerals. In addition, each constituent element once explained will not be explained again. The constituent element with R, G, or B after its reference numeral is one necessary to be distinguished in a plurality of light paths separated by colors (for example, R, G, and B represent the red color, green color, and blue color, respectively). Further, the subscriptions will be omitted as long as there is no problem in the explanation.

A configuration of a projection type display apparatus for displaying an image according to an embodiment of the present invention will be described with reference to FIG. 1.

Next, the configuration of the projection type display apparatus for displaying an image will be described. FIG. 1 is a diagram showing a configuration example of the projection type display apparatus for displaying an image. In the three-plate projection type display apparatus for displaying an image of FIG. 1, the reference numeral 1 denotes a light source that is a white lamp such as an ultrahigh-pressure mercury lamp, a metal halide lamp, a xenon lamp, a mercury xenon lamp, and a halogen lamp. The light source 1 includes at least a reflecting mirror 2 with a circular or polygonal emission aperture. Light emitted from the light source 1 moves to a projection lens 200 through light valves 14R, 14G, and 14B including image display elements, and is projected to a screen 100. The light irradiated from the lamp of the light source 1 is paralleled with an optical axis after being reflected by the reflecting mirror 2 with, for example, a paraboloidal surface, and enters a first lens array 3. The configurations of the light source 1 and the reflecting mirror 2 are referred to as a light source unit.

The first lens array 3 is configured by a plurality of rectangular lens cell areas arranged in a matrix manner, and the incident light is divided into a plurality of lights by the respective lens cell areas to be guided to efficiently pass through a second lens array 4 and a polarized light converting element 5. Specifically, the first lens array 3 is designed in such a manner that the light source 1 and the lens cell areas of the second lens array 4 are in a relation (conjugate relation) of an object and an image. As similar to the first lens array 3, the second lens array 4 including a plurality of rectangular lens cell areas arranged in a matrix manner projects the shapes of the lens cell areas of the first lens array 3 corresponding to those configuring the second lens array 4 to the image display elements 18 in the light valves 14. At this time, the lights from the second lens array 4 are aligned in a predetermined polarization direction through the polarized light converting element 5.

Between the first lens array 3 and the second lens array 4, light shielding units 501 (to be described later) for controlling the amount of passing light are provided.

Projection images of the respective lens cell areas of the first lens array 3 are superimposed on the image display elements 18 in the light valves 14 by a collecting lens 6, condenser lenses 13, a first relay lens 15, a second relay lens 16, and a third relay lens 17.

The collecting lens 6 has an optical axis 300.

Since the first lens array 3 and the image display elements 18 are designed in a relation (conjugate relation) of an object and an image, a plurality of light fluxes divided by the first lens array 3 are superimposed and projected to the image display elements 18 in the light valves 14 by the second lens array 4 and the collecting lens 6 arranged near the second lens array 4, thus enabling illumination with high-uniformity illuminance distribution which can be practically used without any problems.

During the process, the light reflected by the reflecting mirror 7, for example, a light B (light of blue color spectrum) is reflected by a dichroic mirror 11, and a light G (light of green color spectrum) and a light R (light of red color spectrum) pass through the dichroic mirror 11 to be separated into two colors. Further, the light G and the light R are separated into the light G and the light R through a dichroic mirror 12. For example, the light G is reflected by the dichroic mirror 12, and the light R passes through the dichroic mirror 12. Various methods of separating the light are conceivable and the following method may be employed: the light R is allowed to be reflected by the dichroic mirror 11, and the light G and the light B are allowed to pass through the dichroic mirror 11. Alternatively, the light G is allowed to be reflected by the dichroic mirror 11, and the light R and the light B are allowed to pass through the dichroic mirror 11.

In the configuration of FIG. 1, the light B is reflected by the dichroic mirror 11 and then reflected by a reflecting mirror 10 to enter a photosynthetic prism 21 after passing through the light-B light valve 14B via the condenser lens 13B. Here, the light B which passes through the condenser lens 13B to enter the light valve 14B is referred to as LB. Among the light G and the light R which pass through the dichroic mirror 11, the light G is reflected by the dichroic mirror 12 to enter the light-G light valve 14G via the condenser lens 13G, and then enters the photosynthetic prism 21 after passing through the light valve 14G. Here, the light G which passes through the condenser lens 13G to enter the light valve 14G is referred to as LG. The light R passes through the dichroic mirror 12 to be collected by the first relay lens 15, and then is reflected by a reflecting mirror 8 to be further collected by the second relay lens 16. Then, the light R is reflected by a reflecting mirror 9 to enter the light-R light valve 14R after being further collected by the third relay lens 17. The light R which passes through the light valve 14R enters the photosynthetic prism 21. Here, the light R which passes through the third relay lens 17 to enter the light valve 14R is referred to as LR.

The light B, the light G, and the light R which pass through the respective image display elements 18 are combined as a color image by the photosynthetic prism 21, and then pass through the projection lens 200 such as a zoom lens to reach the screen 100. The optical image formed by performing optical intensity modulation in accordance with an image signal (not shown) with the image display elements 18 in the light valves 14 is extended, projected and displayed on the screen 100 by the projection lens 200.

Figure 2:
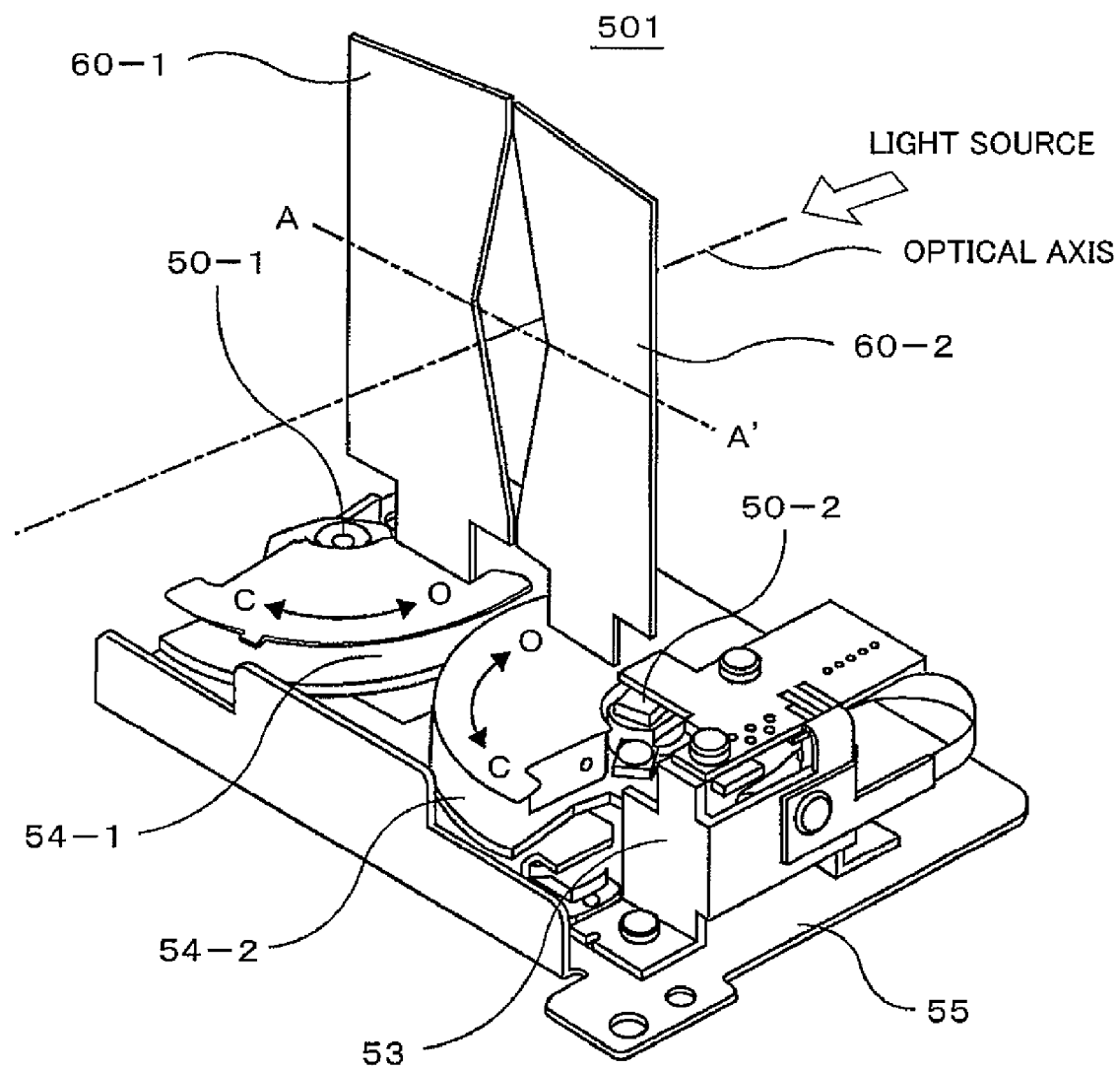
FIG. 2 is a diagram for explaining the embodiment of a light shielding unit according to the present invention.

The light shielding unit 501 according to the embodiment of FIG. 1 employs a light shielding unit for controlling the amount of incident light by rotating (turning) light shielding plates, as will be described in, for example, FIG. 2 and FIGS. 3A and 3B. FIG. 2 is an exterior perspective view of the light shielding unit employed in the embodiment of the present invention. The reference numeral 50-1 denotes a rotation center of a left light shielding plate of the light shielding unit

501, 50-2 denotes a rotation center of a right light shielding plate of the light shielding unit 501, 60-1 denotes the left light shielding plate, and 60-2 denotes the right light shielding plate. In addition, a horizontal plane which passes through the line A-A' of FIG. 2 is a horizontal axis (to be described later) 403. Further, the reference numeral 53 denotes a motor unit, and 54-2 denotes a gear which rotates in the arrow direction along with the rotation of the motor unit 53. The reference numeral 54-1 denotes a gear which is engaged with the gear 54-2 and rotates along with the rotation of the gear 54-2, and 55 denotes a chassis. The arrow in the "O" direction represents the rotational direction of the light shielding plates in the case of decreasing a stop-down level, and the arrow in the "C" direction represents the rotational direction of the light shielding plates in the case of increasing a stop-down level. The components to be mounted are attached to the chassis 55, and the chassis 55 is further attached to the projection type display apparatus for displaying an image according to the embodiment of the present invention as a part of the configuration.

The light which is emitted from the light source unit (the light source 1 and the reflecting mirror 2) and passes through the first lens array 3 enters from the direction of the arrow to the direction of the dotted line, and enters the second lens array 4 after the amount of light is adjusted through an aperture of the left and right light shielding plates 60-1 and 60-2 in the light shielding unit 501. The motor unit 53 rotates to open and close the left and right light shielding plates 60-1 and 60-2 with a signal from a control unit (to be described later) for controlling the light shielding unit 501, and transmits the rotation power to the gears 54-2 and 54-1 to change the rotation angles of the gears 54-2 and 54-1. By changing the open and close angles of the left and right light shielding plates 60-1 and 60-2 with the rotation angles of the gears 54-2 and 54-1, the amount of light which passes through the light shielding unit 501 is adjusted.

Figure 3A:
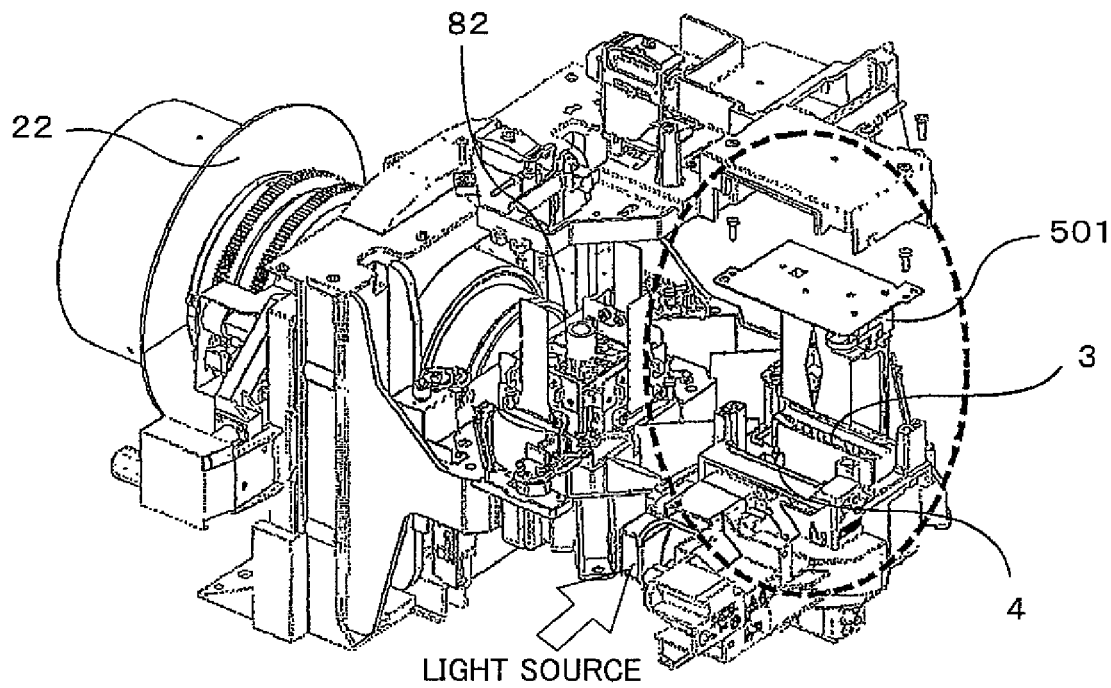
FIGS. 3A and 3B are diagrams, each explaining an embedded state of the embodiment of the light shielding unit according to the present invention.
Figure 3B:
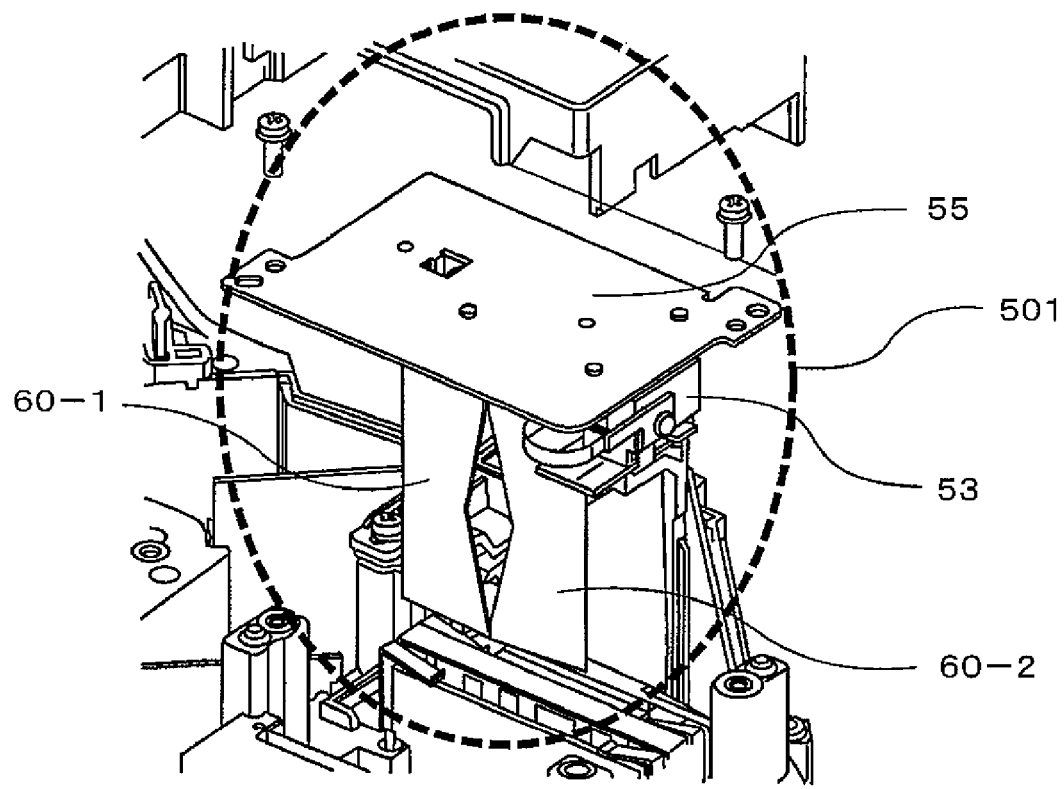

FIGS. 3A and 3B are diagrams each explaining a state in which the light shielding unit 501 is embedded into the projection type display apparatus for displaying an image according to the embodiment of the present invention. FIG. 3A is a perspective view for showing an optical system portion which is a part of the projection type display apparatus for displaying an image according to the embodiment of the present invention. The reference numeral 3 denotes the first lens array, 4 denotes the second lens array, 501 denotes the light shielding unit, 82 denotes an optical unit, and 22 denotes the projection lens. Further, FIG. 3B is an enlarged view of the dashed circular portion of FIG. 3A.

In FIGS. 3A and 3B, the light shielding unit 501 is embedded between the first lens array 3 and the second lens array 4 while inverting its front side and back side and its upside and downside from the position of FIG. 2.

Figure 4:
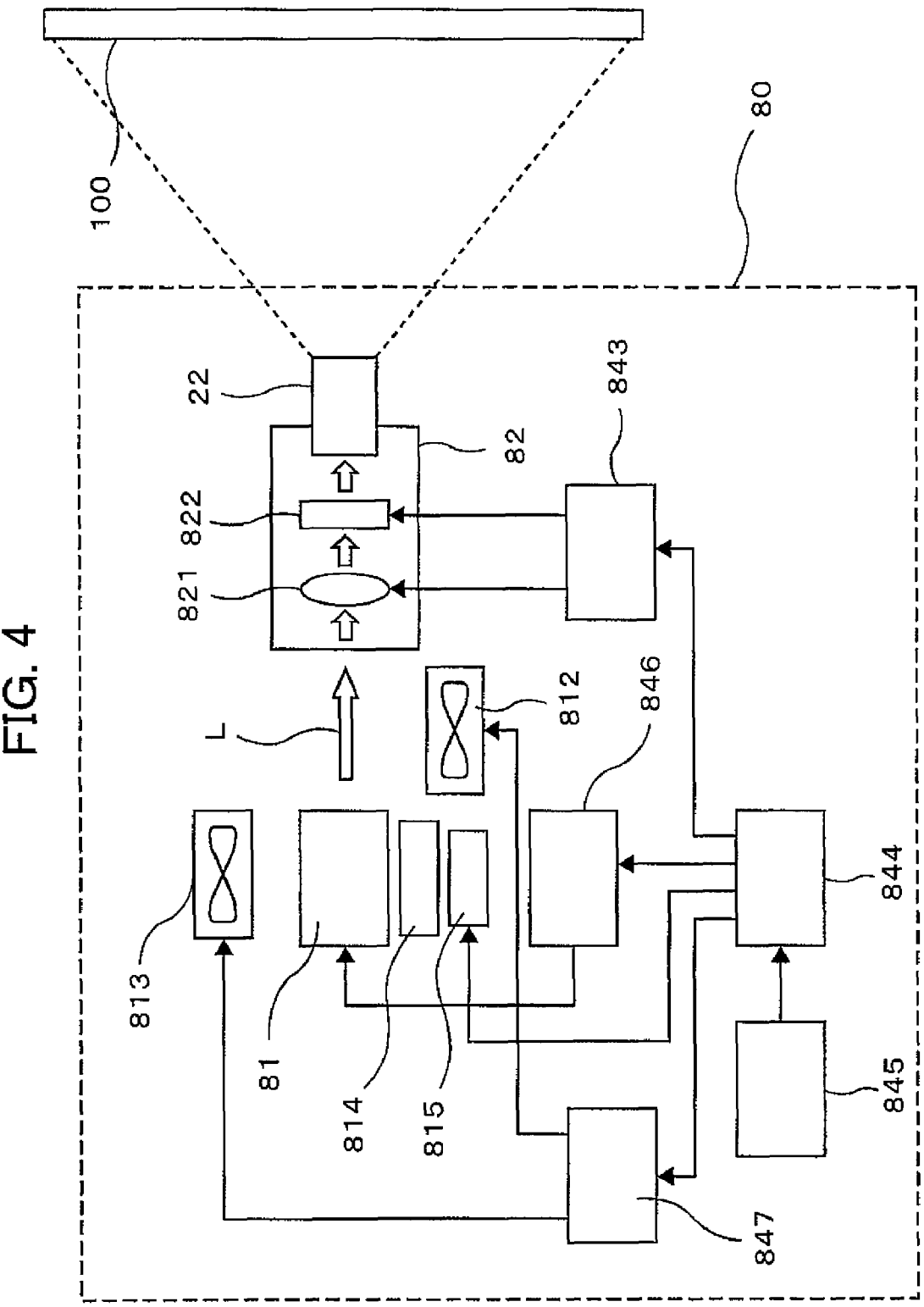
FIG. 4 is a diagram showing a configuration of the embodiment of the projection type display apparatus for displaying an image according to the present invention.

FIG. 4 is a block diagram showing an outline configuration of the projection type display apparatus for displaying an image according to the embodiment of the present invention. The reference numeral 80 denotes the projection type display apparatus for displaying an image, 100 denotes the screen, 81 denotes the light source unit, 82 denotes the optical unit, 821 denotes an illumination optical system of the optical unit 82, 822 denotes an image display element unit (liquid-crystal panel unit) of the optical unit 82, 22 denotes the projection lens of the optical unit 82, 843 denotes a display driving circuit, 844 denotes a control unit, 845 denotes a operation unit which is an MMI (Man Machine Interface) of the apparatus operated by a user, 846 denotes a light-source power source circuit, 847 denotes a fan power source circuit, 812 denotes an inner cooling fan of the light source unit 81, 813 denotes an outer surface cooling fan of the light source unit 81, 814 denotes a duct, and 815 denotes an air volume adjusting shutter.

The illumination optical system 821 includes, for example, the first lens array 3, the light shielding unit 501, the second lens array 4, the polarized light converting element 5, and the collecting lens 6 of FIG. 1.

In the projection type display apparatus 80 for displaying an image of FIG. 4, a light L emitted from the light source unit 81 enters the optical unit 82. The illumination optical system 821 uniforms the light amount distribution of the light L from the light source unit 81 to be irradiated to the image display element unit 822. The image display element unit 822 is driven by the display driving circuit 843, and forms a display light obtained by modulating the light L with an optical image (not shown) in accordance with an image signal. The display light formed is projected from the emission aperture of the projection lens 22 to a screen provided outside or an irradiation plane 100 such as a wall plane.

The arrows of the light L and the like emitted from the light source unit 81 in FIG. 4 are only schematically illustrated for explanation, and the arrangements, angles, sizes, directions of the light are not accurate. Further, the optical system for each of three colors (R, G, and B) explained in FIG. 1 is actually omitted in the image display element unit 822.

In FIG. 4, the projection type display apparatus for displaying an image is controlled by the control unit 844 configured by a CPU (Central Processing Unit) operated in accordance with a program that is stored in a ROM (Read Only Memory) or the like. The control unit 844 performs a predetermined process in response to a button of the operation unit 845 operated in a button operation by a user. For example, the control unit 844 turns on or off the light source of the light source unit 81 through the light-source power source circuit 846, and in accordance with the turning-on or turning-off of the light source, the control unit 844 operates or stops the inner cooling fan 812 of the light source unit 81, the outer surface cooling fan 813 of the light source unit 81, the duct 814, and the air volume adjusting shutter 81 through the fan power source circuit 847. In addition, the control unit 844 controls the display driving circuit 843 to display an image.

Further, the display driving circuit 843 detects the brightness of the display light formed by the image display element unit 822, and controls an open/close angle of the light shielding unit 501 of the illumination optical system 821 on the basis of the detected brightness value. For example, a brightness value for each frame of the original image signal of the display light to be formed is detected. In the case where the brightness value is a predetermined value P or larger, the light shielding plates 60-1 and 60-2 are put in a fully-opened state (the minimum level of stop-down, namely, the maximum amount of transmission light). In the case where the brightness value is a predetermined value Q or smaller, the light shielding plates 60-1 and 60-2 are put in a fully-closed state (the maximum level of stop-down, namely, the minimum amount of transmission light). In the case where the brightness value is between the predetermined value P and the predetermined value Q, the open/close angles of the light shielding plates are changed stepwise.

The detection of the brightness value may be performed using, for example, a well-known AGC (Auto Gain Control) function. Further, the brightness value may be calculated as an average value of each pixel using, for example, an image processing function, or may be calculated as an average value of each pixel for a predetermined area.

Alternatively, in the case where a well-known scene changing point is detected, the brightness value is detected and the light shielding unit (iris) may be controlled so as to become the amount of light corresponding to the detected brightness value.

Further, the light shielding unit may be controlled for each frame, but the light shielding unit may be controlled for a plurality of frames.

Furthermore, the display driving circuit 843 detects the brightness of the display light formed by the image display element unit 822, and controls the open/close angle of the light shielding unit 501 of the illumination optical system 821 on the basis of the detected brightness value in the above-described embodiment. However, by receiving information of the brightness value of the image signal from the display driving circuit 843 by the control unit 844, the control unit 844 may directly control the open/close angle of the light shielding unit 501 of the illumination optical system 821.

Furthermore, the control unit 844 includes at least any one of the display driving circuit 843, the light-source power source circuit 846 and the fan power source circuit 847, and may be provided with these functions.

Next, a relation between the shape of the aperture of the light shielding plates of the light shielding unit and the projection light of the second lens array will be described with reference to FIGS. 5 to 11.

Figure 5:
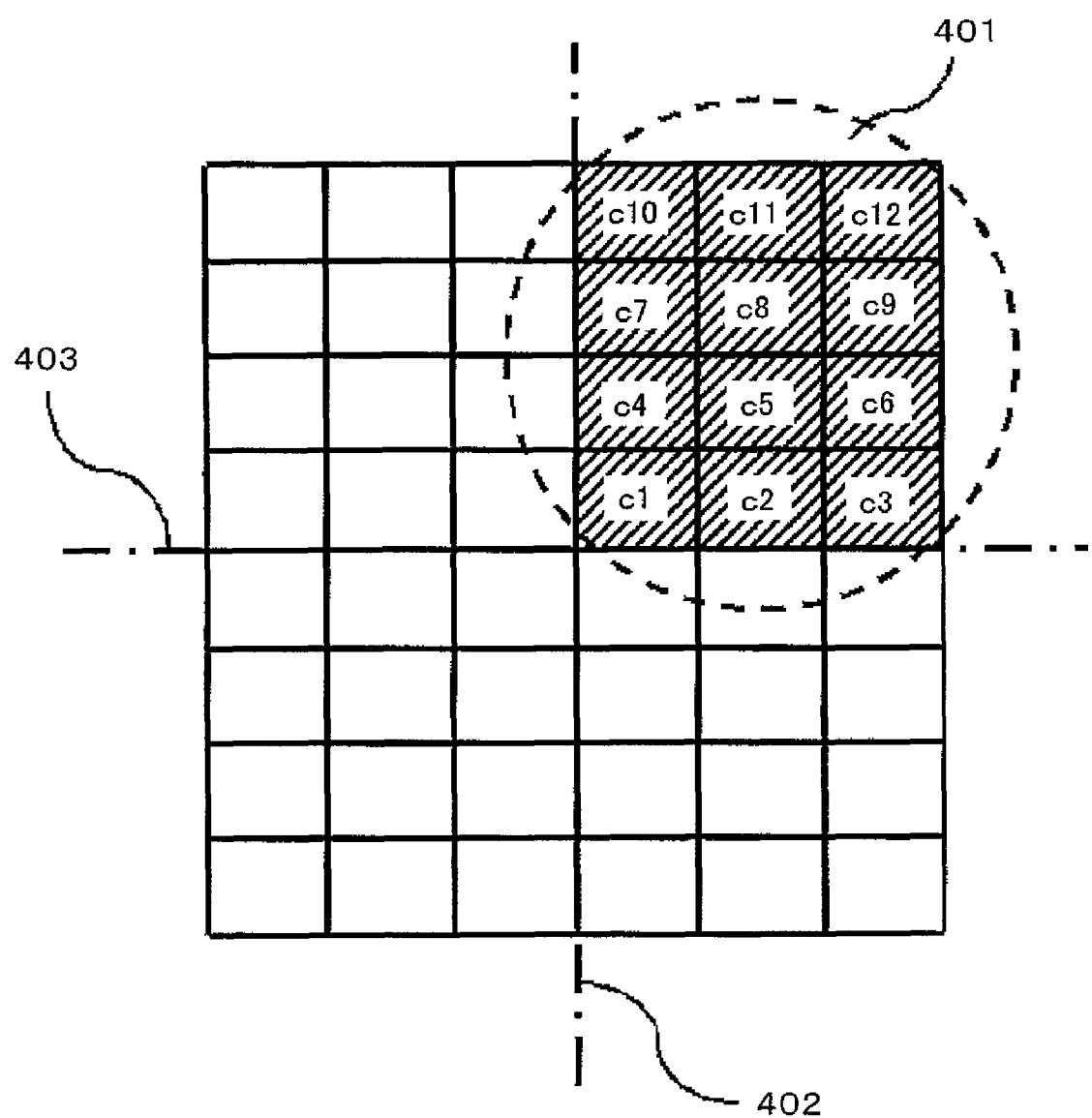
FIG. 5 is a diagram showing arrangement of respective lens cell areas configuring a second lens array of the embodiment according to the present invention.

FIG. 5 is a diagram showing arrangement of the respective lens cell areas configuring the second lens array 4, and the inside of the frame shows the respective lens cell areas. Further, an intersection point of the horizontal axis 403 and a perpendicular axis 402 which are illustrated using chain lines is the center of the optical axis.

In the following description, unless otherwise noted, the projection light passing through a portion (a portion encircled by the dashed circle) of the plural lens cell areas 401 shown by the diagonal lines is described. The respective lens cell areas of the diagonal line portion 401 are represented by c1 to c12.

Figure 6D:
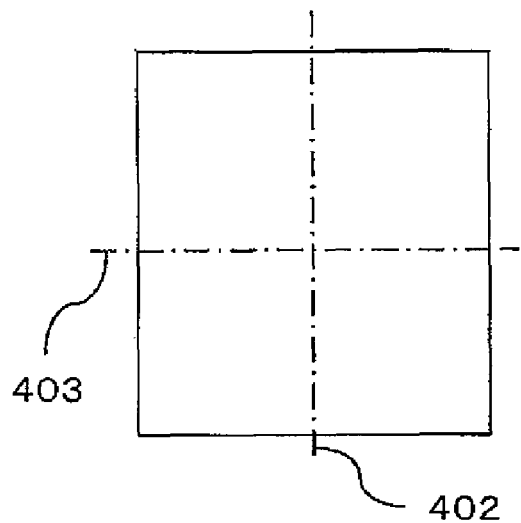
FIGS. 6A to 6D are diagrams, each explaining the shape of light shielding plates of the embodiment according to the present invention.
Figure 6B:
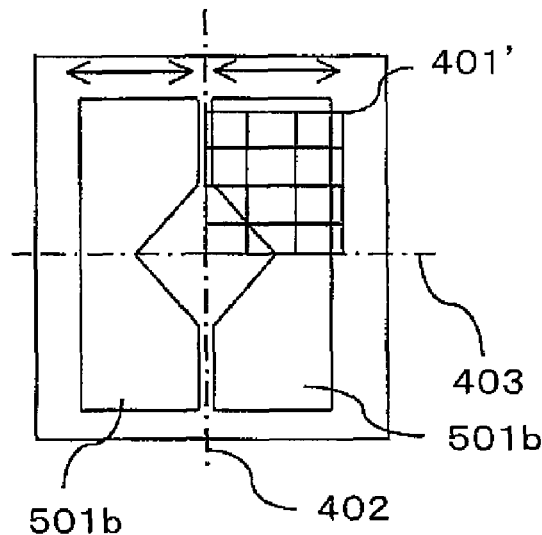
Figure 6A:
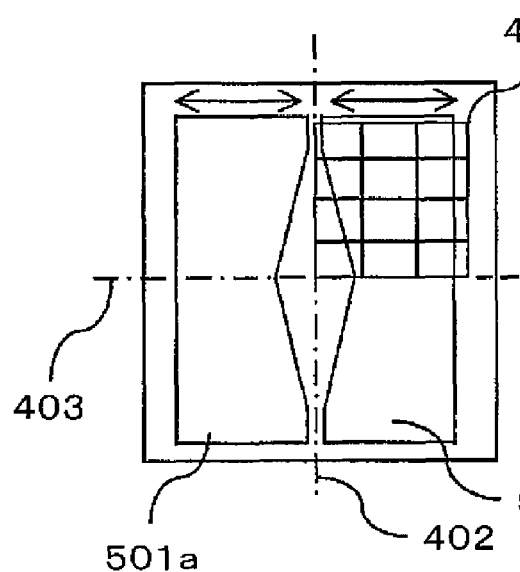
Figure 6C:
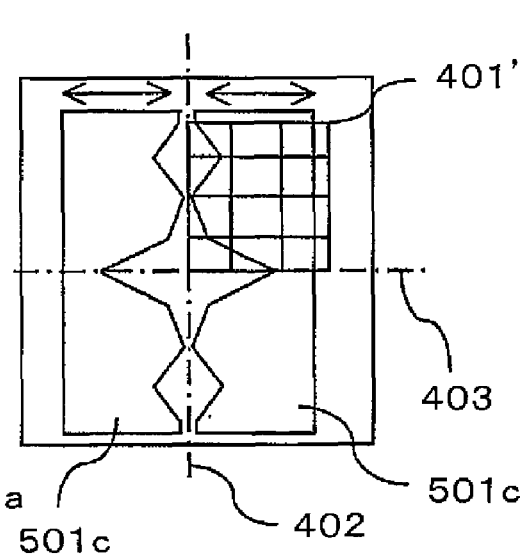
Figure 7D:
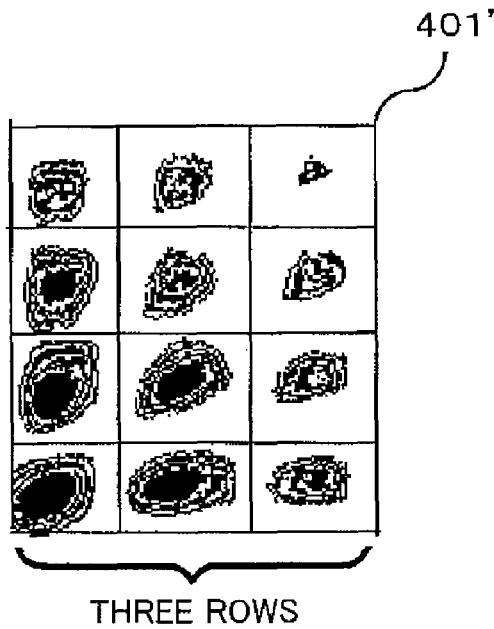
FIGS. 7A to 7D are diagrams, each explaining the shape of the light shielding plates and distribution of a projection optical image of the embodiment according to the present invention.
Figure 7B:
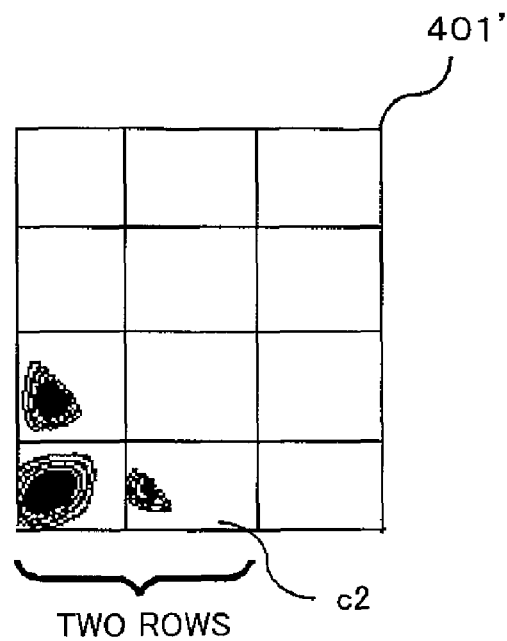
Figure 7A:
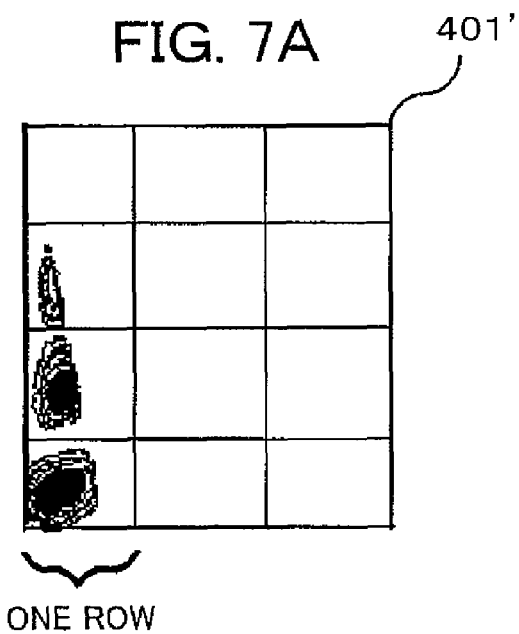
Figure 7C:
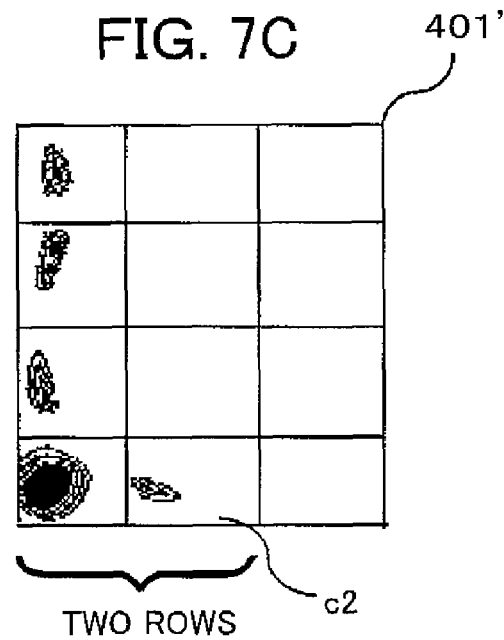

FIGS. 6A to 6D and FIGS. 7A to 7D are diagrams, each explaining the projection light passing through the lens cell area 401 of the diagonal line portion of the second lens array 4 shown in FIG. 5. For convenience of explanation, FIGS. 6D and 7D are shown first. FIG. 6D is a diagram of the aperture viewed from the light source unit side in the case where the light shielding unit is in an open (fully-opened) state, FIG. 6A is a diagram of the aperture viewed from the light source unit side in the case where light shielding plates 501a are in a shape (I) and in a fully-closed state, FIG. 6B is a diagram of the aperture viewed from the light source unit side in the case where light shielding plates 501b are in a shape (II) and in a fully-closed state, and FIG. 6C is a diagram of the aperture viewed from the light source unit side in the case where light shielding plates 501C are in a shape (III) and in a fully-closed state. FIG. 7D is a diagram showing distribution of the projection light of a lens cell area 401' shown by the diagonal lines in the case of FIG. 6D, FIG. 7A is a diagram showing distribution of the projection light of the lens cell area 401' shown by the diagonal lines in the case of FIG. 6A, FIG. 7B is a diagram showing distribution of the projection light of the lens cell area 401' shown by the diagonal lines in the case of FIG. 6B, and FIG. 7C is a diagram showing distribution of the projection light of the lens cell area 401' shown by the diagonal lines in the case of FIG. 6C. For convenience of illustration, as the shading becomes darker, the amount of light becomes larger, and as the shading becomes lighter, the amount of light becomes smaller in the shading in FIGS. 7A to 7D. The white portions represent a light amount of nearly 0.

Further, each of the frames illustrated in FIGS. 7A to 7D is the projection area 401' corresponding to the lens cell areas c1 to c12 of the lens cell area 401 in FIG. 5. Likewise, each of the frames illustrated in FIGS. 6A to 6C is also the projection area 401' corresponding to the lens cell areas c1 to c12 of the lens cell area 401 in FIG. 5.

As shown in FIG. 6D, at the time of the fully-opened state, the aperture is opened irrespective of the shape of the light shielding plates, all the light emitted from the light source unit passes therethrough. At this time, the distribution of the light that passes through the respective lens cell areas C1 to c12 to be projected to, for example, the polarized light converting element 5 is shown in FIG. 7D. As described above, the amount of light that passes through the second lens array to be projected becomes smaller towards the normal direction from the center of the optical axis, and the tendency can be remarkably observed in the horizontal direction.

As shown in FIG. 6A, the aperture in the case where the light shielding plates 501a are in the shape (I) and in the fully-closed state is in an oblique rhombic aperture shape which is steep in the vertical (perpendicular) direction. In addition, its boundary portion is provided so as to traverse the lens cell areas c1, c4, c7, and c10 of the projection light. As a result, the distribution of the light projected to the polarized light converting element 5 is shown in, for example, FIG. 7A and the light passes through only the areas being not shielded by the light shielding plates as compared to the FIG. 7D.

As shown in FIG. 6B, the aperture in the case where the light shielding plates 501b are in the shape (II) and in the fully-closed state is in an oblique rhombic aperture shape with substantially the same length in the vertical (perpendicular) direction and the lateral (horizontal) direction. Specifically, its boundary portion is provided so as to traverse the lens cell areas c1 and c4 of the projection light. As a result, the distribution of the light projected to the polarized light converting element 5 is shown in, for example, FIG. 7B and the light passes through only the areas being not shielded by the light shielding plates 501b as compared to the FIG. 7D.

Further, as shown in FIG. 6C, the aperture in the case where the light shielding plates 501c are in the shape (III) and in the fully-closed state is in an aperture shape where a plurality of oblique rhombic shapes exist. Specifically, its boundary portion is provided so as to traverse the lens cell areas c1, c2, c4, c7, and c10 of the projection light. As a result, the distribution of the light projected to the polarized light converting element 5 is shown in, for example, FIG. 7C and the light passes through only the areas being not shielded by the light shielding plates 501c as compared to the FIG. 7D.

Figure 8D:
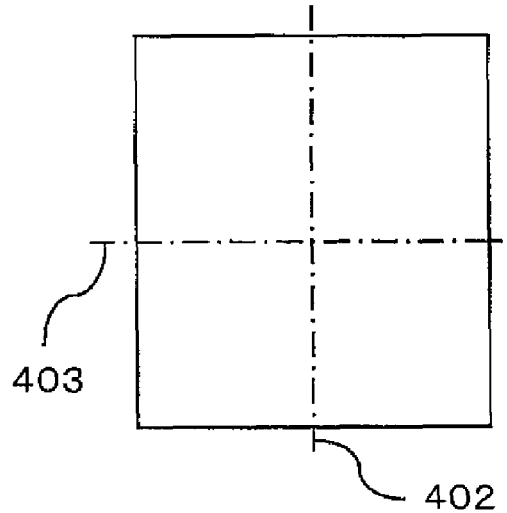
FIGS. 8A to 8D are diagrams, each explaining the shape of the light shielding plates of the embodiment according to the present invention.

Next, there will be described the embodiment of linear characteristics of illuminance changes with respect to changes of the rotation angle of the light shielding plate of the present invention, with reference to FIGS. 8A to 8D to FIG. 10. FIGS. 8A to 8D are diagrams, each showing the aperture viewed from the light source unit side in the case where an open angle of the light shielding plates is 60 degrees (Π/3 rad). It should be noted that the open angle at the time of the fully-opened state is 0 degree (0rad) and the open angle at the time of the fully-closed state is 90 degrees (Π/2 rad). For convenience of explanation, FIG. 6D that is in a state where the light shielding plates are fully opened is illustrated again as FIG. 8D, and FIG. 7D is illustrated again as FIG. 9D.

Figure 8B:
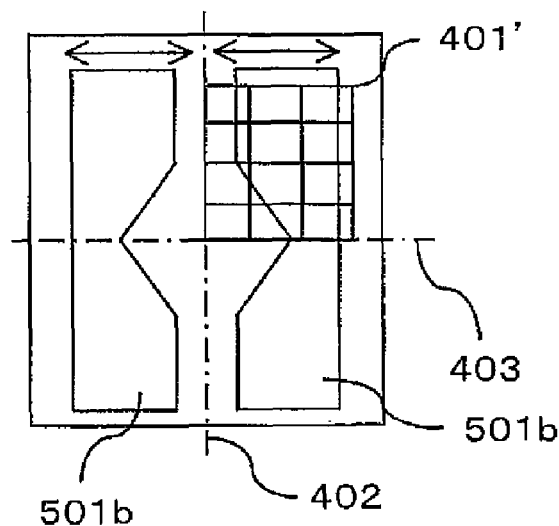
Figure 8A:
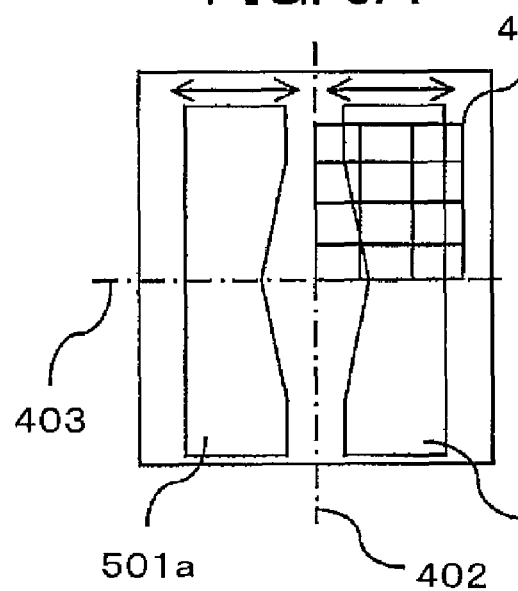
Figure 8C:
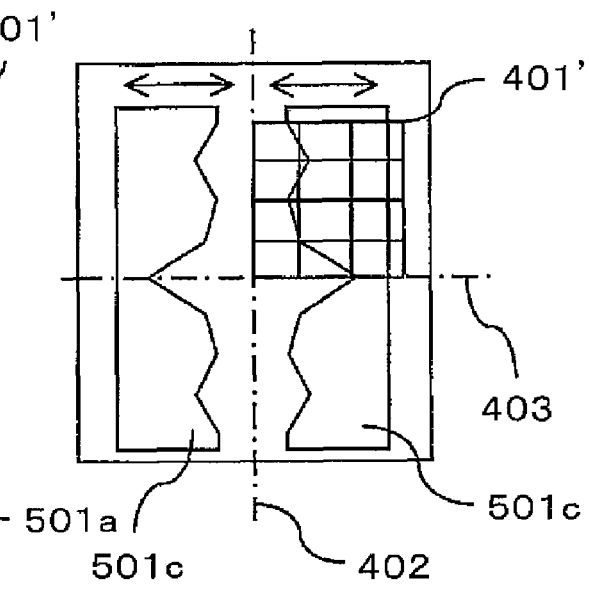
Figure 9D:
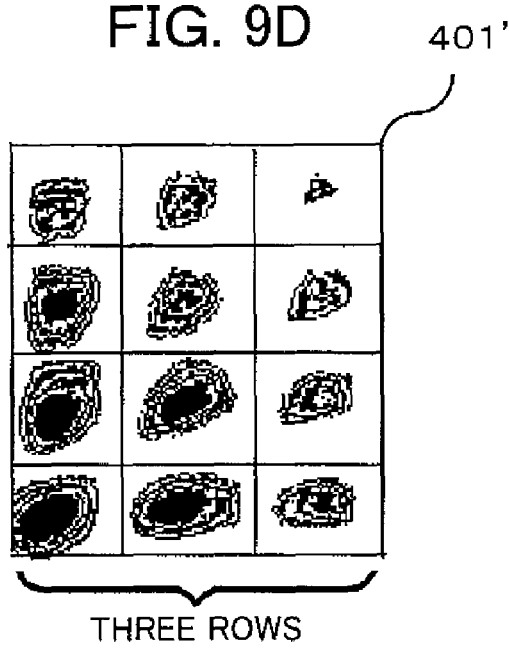
FIGS. 9A to 9D are diagrams, each explaining the shape of the light shielding plates and distribution of the projection optical image of the embodiment according to the present invention.
Figure 9B:
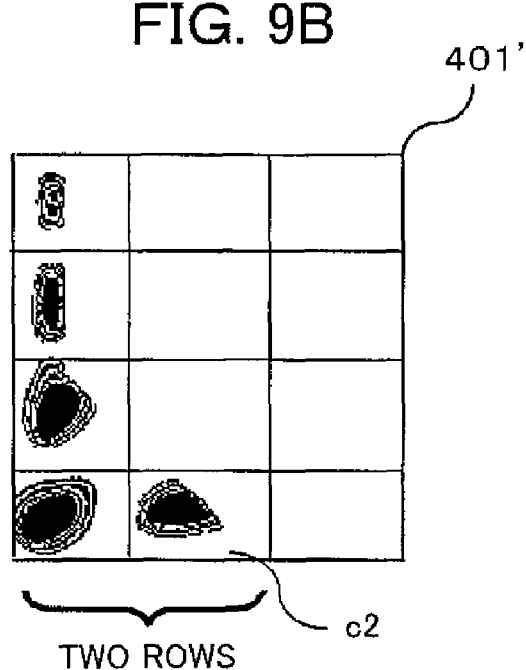
Figure 9A:
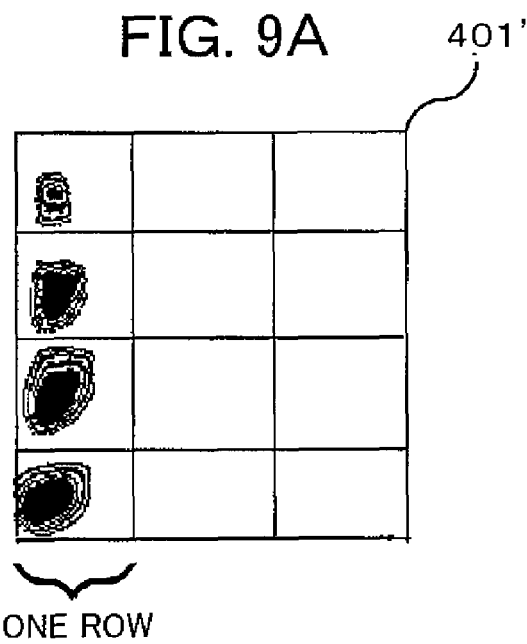
Figure 9C:
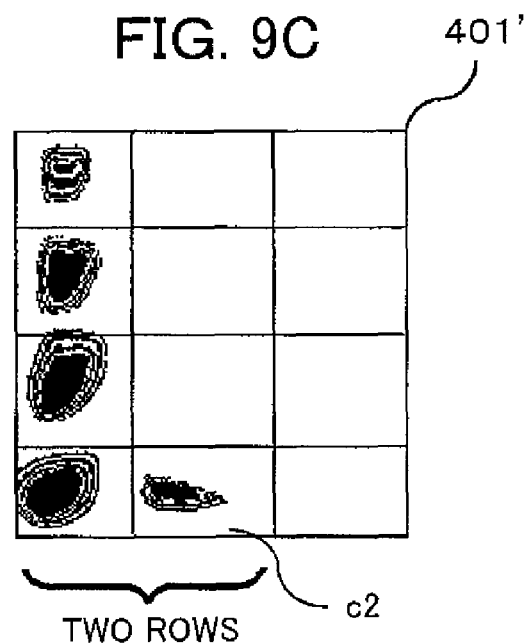

FIG. 8A is a diagram of the aperture viewed from the light source unit side in the case where the light shielding plates 501a are in the shape (I), FIG. 8B is a diagram of the aperture viewed from the light source unit side in the case where the light shielding plates 501b is in the shape (II), and FIG. 8C is a diagram of the aperture viewed from the light source unit side in the case where the light shielding plates 501C are in the shape (III). FIG. 9A is a diagram showing distribution of the projection light of the lens cell area 401 shown by the diagonal lines in the case of FIG. 8A, FIG. 9B is a diagram showing distribution of the projection light of the lens cell area 401 shown by the diagonal lines in the case of FIG. 8B, and FIG. 9C is a diagram showing distribution of the projection light of the lens cell area 401 shown by the diagonal lines in the case of FIG. 8C. The shading shown in FIGS. 9A to 9D is the same as the case in FIGS. 7A to 7D.

Further, the frames $c_1$ to $c_{12}$ shown in FIGS. 9A to 9C are projection areas corresponding to the respective lens cell areas $c_1$ to $c_{12}$ of the lens cell area 401 of FIG. 5. Likewise, the frames shown in FIGS. 8A to 8C are also projection areas corresponding to the respective lens cell areas $c_1$ to $c_{12}$ of the lens cell area 401 of FIG. 5.

Figure 10:
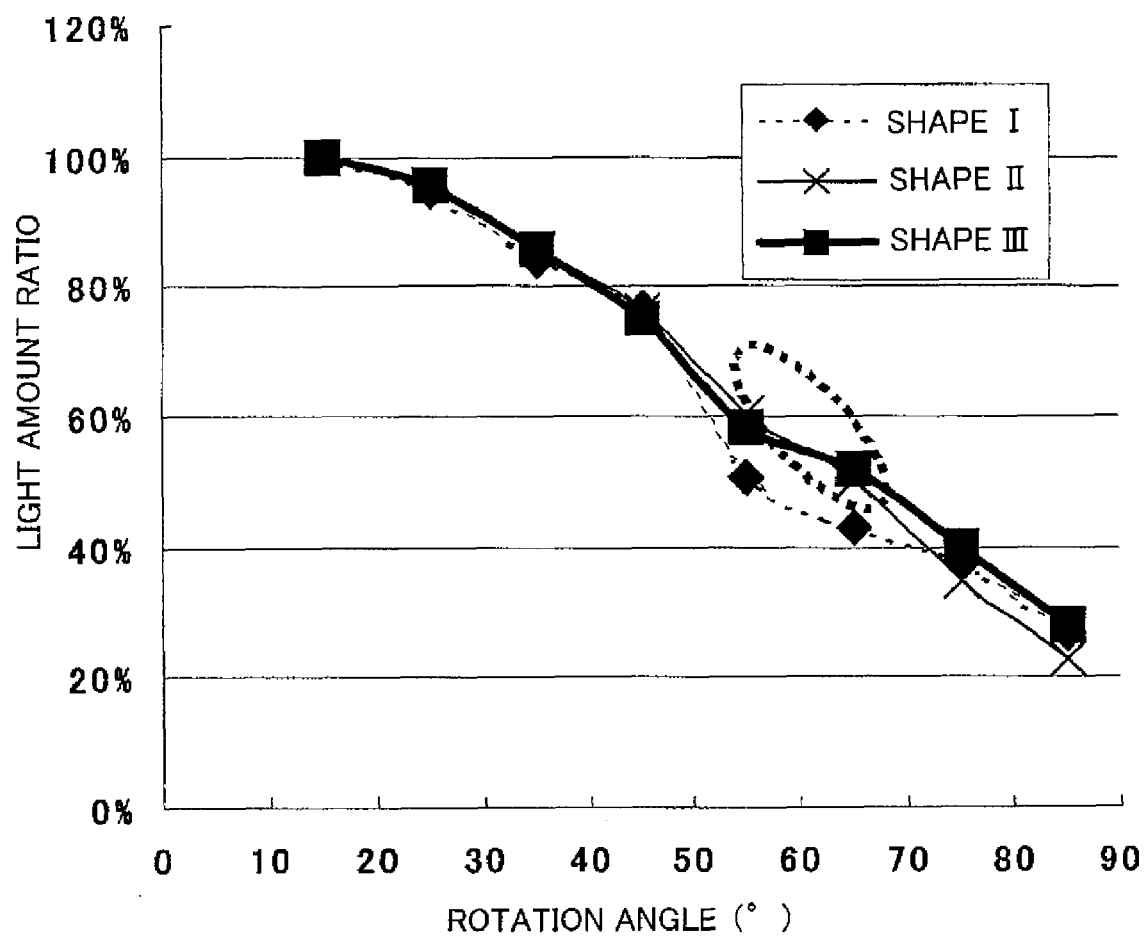
FIG. 10 is a diagram showing the embodiment of a relation between a rotation angle and the amount of projection light according to the present invention.

FIG. 10 is a diagram showing illuminance changes with respect to the open angle of the light shielding plate calculated by simulations for the embodiment of the present invention according to FIGS. 6A to 6C, 7A to 7C, 8A to 8C, and 9A to 9C.

The horizontal axis represents an open angle (degree) and the vertical axis represents a light amount ratio (%). It should be noted that when the light shielding plates are fully opened, the open angle is 0 degree, and when the light shielding plates are fully closed, the open angle is 90 degrees.

As a result of the embodiment in FIGS. 6A to 6D to FIG. 10, if the light apart from the center (the intersection point of the perpendicular axis 402 and the horizontal axis 403) of the optical axis is increased, the contrast is decreased. In order to overcome the disadvantage, as shown in FIGS. 6A to 6D to FIGS. 9A to 9D, there are employed the light shielding plates whose shapes allow the amount of light passing through the center of the optical axis to increase. Further, with respect to an increase or decrease of the angle by which the light shielding plates of the light shielding unit are rotated, substantially the same amount of light is increased or decreased. Accordingly, deterioration of images due to opening or closing of the light shielding unit of the projection type display apparatus for displaying an image can be reduced.

Specifically, as in the embodiment of FIGS. 6A to 6D to 10, the decrease of the contract can be suppressed by the shape of the light shielding plates which allows light to pass through a plurality of lens cell areas in the perpendicular direction as parts of the lens cell areas $c_1$, $c_4$, and $c_7$ in the perpendicular (vertical) direction at a row of lens cell areas in the horizontal direction.

Further, as the embodiment of FIGS. 6B, 6C, 7B, 7C, 8B, 8C, 9B and 9C, the linear characteristics of the illuminance changes (light amount changes) with respect to changes of the rotation angle of the light shielding plate can be improved by the shape of the light shielding plates which allows light to pass through the lens cell areas $c_1$ and $C_4$ in the perpendicular direction and parts (for example, parts of the lens cell areas of two areas in the perpendicular direction and two areas in the horizontal direction) of the lens cell areas in the horizontal (lateral) direction. Specifically, in an elliptic portion shown by the dashed line in FIG. 10, the linear characteristics around 60 degrees of the open angle of the light shielding plates is deteriorated as shown by the result of the shape I of the light shielding plates 501$a$. However, by providing the light shielding plates so as to open a part of the lens cell area $c_2$ as shown in FIGS. 6B, 6C, 7B, 7C, 8B, 8C, 9B, and 9C of the embodiment, the linear characteristics are improved as shown in FIG. 10.

Accordingly, the decrease of the contrast can be suppressed, and the deterioration of the image can be improved. Further, this effect can be improved by increasing the amount of light passing through the lens cell areas ($c_1$, $c_4$, $c_7$, and the like) in the perpendicular direction more than that passing through the lens cell areas ($c_1$, $c_2$, $c_3$, and the like) in the horizontal direction.

Furthermore, as shown in FIGS. 6C, 7C, 8C, and 9C, in the light shielding plates 501$c$ with the shape III, four or more lens cell areas in the vicinity of the center of the optical axis are not light-shielded, so that an aperture area is increased. As a result, the uneven color of the image can be improved.

Figure 11:
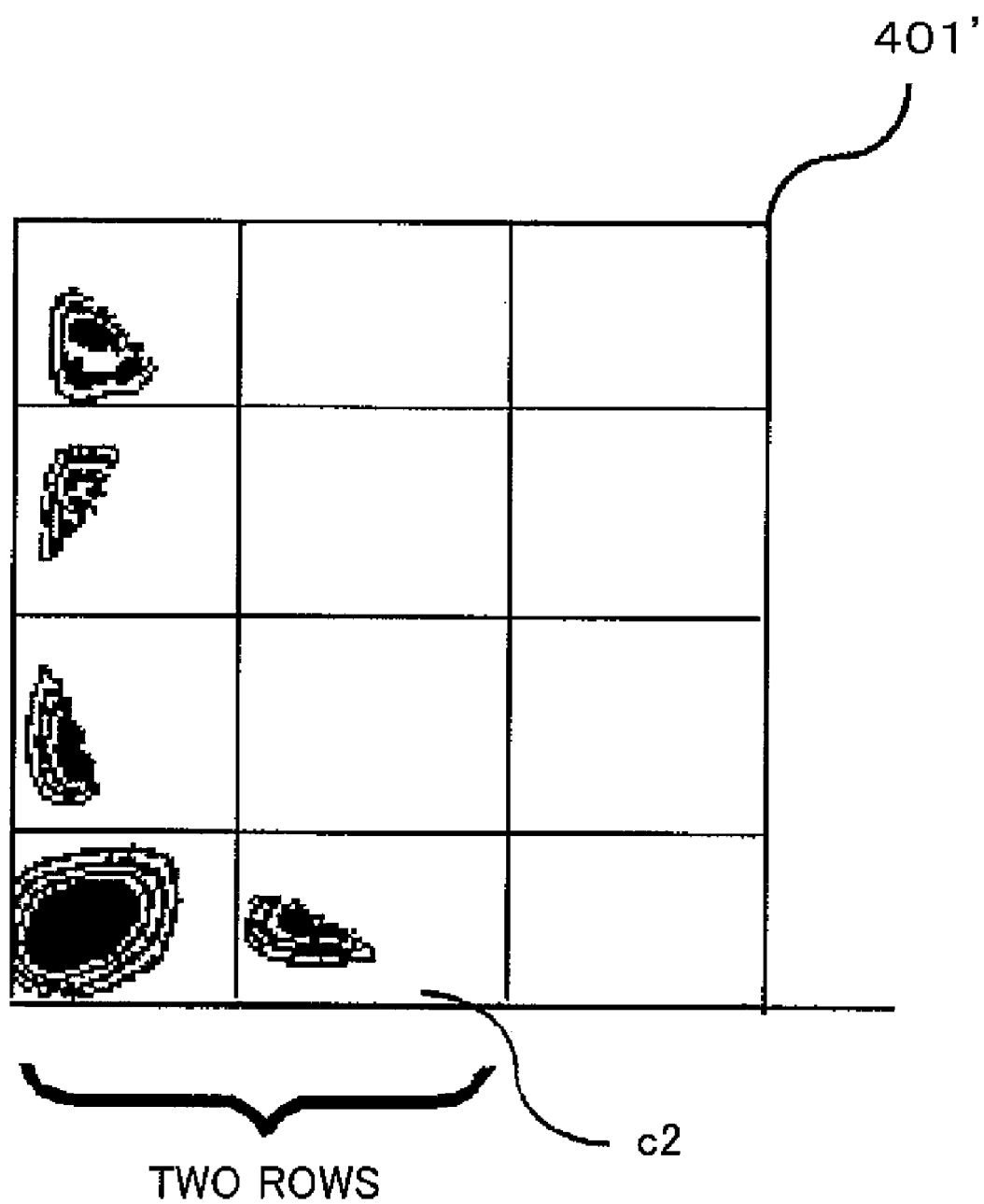
FIG. 11 is a diagram for explaining the shape of the light shielding plates and distribution of the projection optical image of the embodiment according to the present invention.

In the above-described embodiment, the aperture of the light shielding plates is provided so as to obliquely traverse even the lens cell area $c_1$ that is nearest to the center of the optical axis. However, it is not necessary to light-shield the lens cell area $c_1$ so as to obtain a projection optical image shown in FIG. 11. FIG. 11 is a diagram showing a state in which in the case of the shape III of the light shielding plates 501$c$ in each of FIGS. 6A to 6D and FIGS. 7A to 7D, the aperture of the light shielding plates is made much wider, so that the light fully passes through the lens cell area $c_1$.

As the above-described embodiment, the projection type display apparatus for displaying an image according to the embodiment of the present invention includes the light source, the first lens array having a plurality of lens cell areas by which the emission light emitting from the light source is divided into a plurality of light fluxes, the second lens array having a plurality of lens cell areas through which the emission light fluxes from the first lens array pass, the collecting lens which collects the emission light fluxes from the second lens array, the display element which receives the light fluxes collected by the collecting lens to pass through or reflect, the projection lens which emits the transmission light or the reflected light from the display element, and the light shielding unit which light-shields the light fluxes from the first lens array to the second lens array. The light shielding unit light-shields at least parts of all the lens cell areas except for the lens cell area in contact with the optical axis among a plurality of rectangular lens cell areas of the second lens array, and a light shielding area in the lens cell area in contact with the optical axis is smaller than that in any of the lens cell areas except for the lens cell area in contact with the optical axis.

Figure 12:
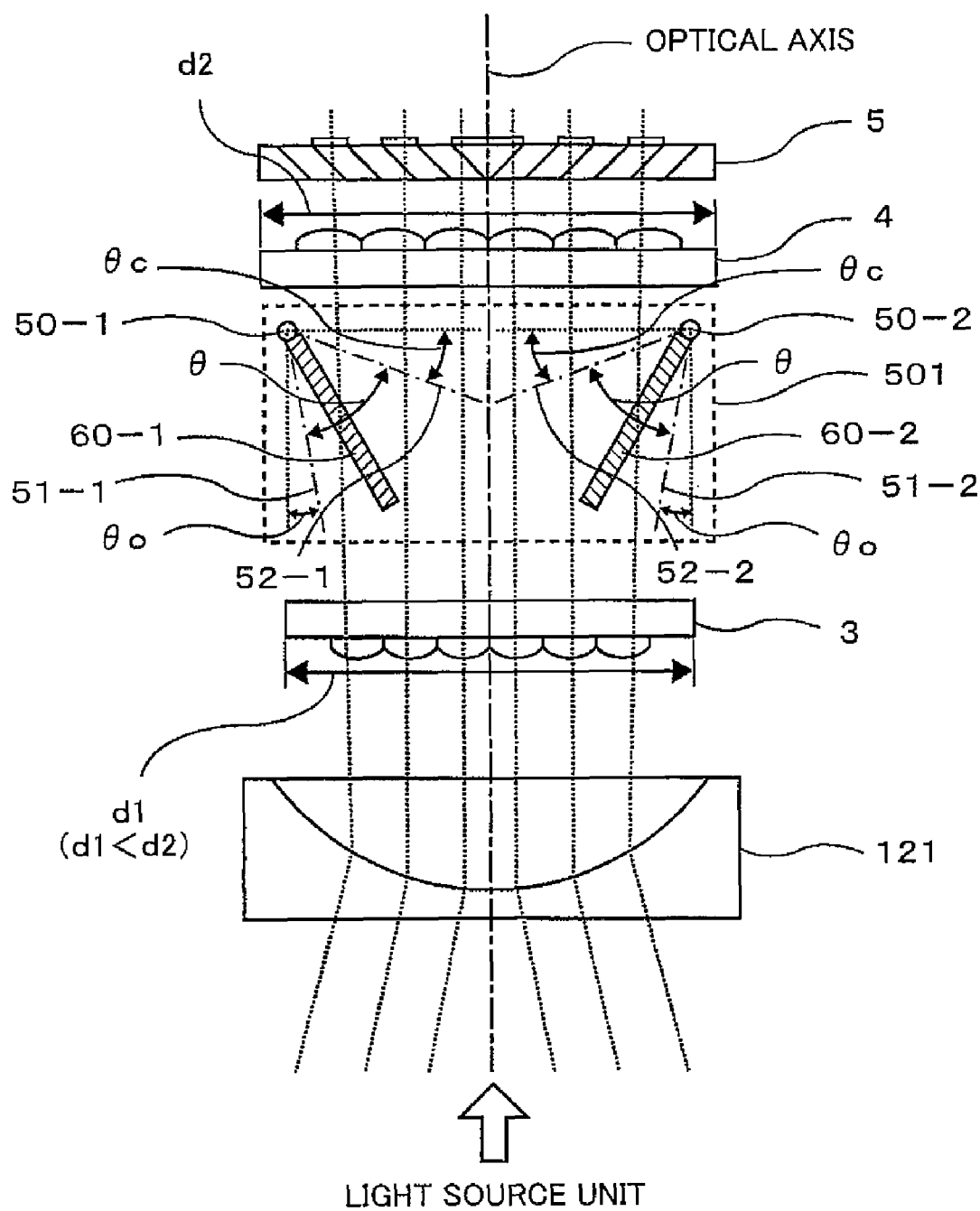
FIG. 12 is a diagram for explaining a configuration of the embodiment of the light shielding unit of the projection type display apparatus for displaying an image according to the present invention.

In the embodiment, the first lens array and the second lens array are the same in size. However, as shown in FIG. 12. the second lens array may be larger in size than the first lens array. In FIG. 12, the reference numeral 121 denotes a reflex lens provided if necessary.

Figure 13A:
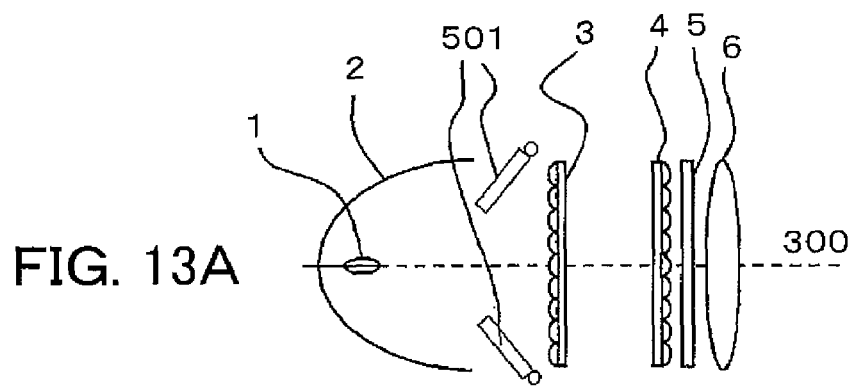
FIGS. 13A to 13D are diagrams, each explaining the embodiment of arrangement of the light shielding unit of the projection type display apparatus for displaying an image according to the present invention.
Figure 13B:
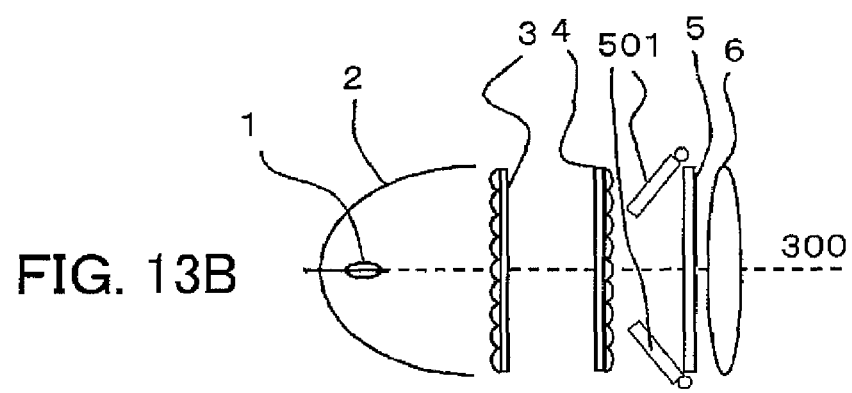
Figure 13C:
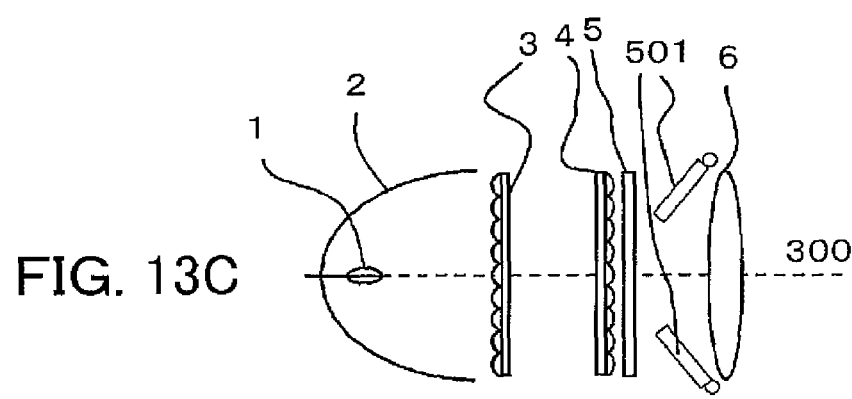
Figure 13D:
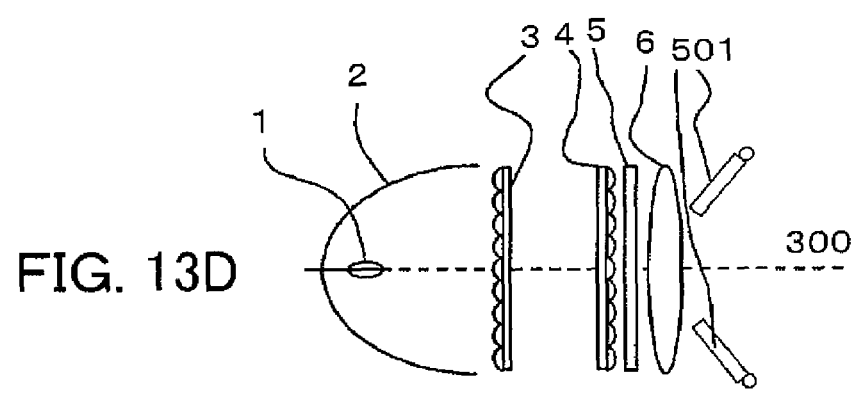

Further, the light shielding unit 501 in FIG. 1 is arranged between the first lens array 3 and the second lens array 4 to light-shield the light flux group by rotation of the light shielding plates. As shown in FIGS. 13A to 13D, the light shielding unit 501 may be provided at an arbitrary position on the optical axis. For example, as shown in FIG. 13A, the light shielding unit 501 may be provided between the light source 1 and the first lens array 3. Further, as shown in FIG. 13B, the light shielding unit 501 may be provided between the second lens array 4 and the polarized light converting element 5. Furthermore, as shown in FIG. 13C, the light shielding unit 501 may be provided between the polarized light converting element 5 and the collecting lens 6. Furthermore, as shown in FIG. 13D, the light shielding unit 501 may be provided on the back side of the collecting lens 6.

Accordingly, in the case where the light shielding unit 501 is arranged between the first lens array 3 and the light source 1, the light which is to pass through the first lens array 3 is the light after passing through the light-shielding unit 501. In the case where the light shielding unit 501 is arranged on the downstream side (back side) of the first lens array 3 relative to the light source 1, the light emitted from the first lens array 3 is light-shielded. It should be noted that illustrations of the optical elements after the collecting lens 6 are omitted in FIG. 12.

Further, the projection type display apparatus for displaying an image according to the embodiment of the present invention includes the light source, the first lens array having a plurality of lens cell areas by which the emission light emitting from the light source is divided into a plurality of light fluxes, the second lens array having a plurality of lens cell areas through which the emission light fluxes from the first lens array pass, the collecting lens which collects the emission light fluxes from the second lens array, the display element which receives the light fluxes collected by the collecting lens to pass through or reflect, the projection lens which emits the transmission light or the reflected light from the display element, and the light shielding unit which light-shields the light fluxes from the first lens array to the second lens array. A plurality of rectangular lens cell areas of the second lens array are arranged in a first direction and in a second direction perpendicular to the first direction. The light shielding unit has the light shielding plates, and light-shields a plurality of rectangular lens cells areas of the second lens array in the first direction by rotation or movement of the light shielding plates. In the case where the light shielding plates are located at a predetermined rotational position or movement position, the light shielding unit partially light-shields at least parts of the lens cell areas among a first group of lens cell areas that are lens cell areas except for the lens cell area in contact with the optical axis of the second lens array and are a plurality of lens cell areas arranged in the first direction and the second direction with respect to the lens cell area in contact with the optical axis. In the first group of lens cell areas, the number of lens cell areas which are partially light-shielded in the lens cell areas arranged in the second direction is larger than that of the lens cell areas which are partially light-shielded in the lens cell areas arranged in the first direction.

Preferably, in the projection type display apparatus for displaying an image, in the case where the light shielding plates of the light shielding unit are located at a predetermined rotational position or movement position, a light shielding area of the lens cell area in contact with the optical axis of the second lens array is smaller than that of any of the lens cell areas of the first group of lens cell areas which are not in contact with the optical axis.

Here, the direction in parallel to the axis 402 is the first direction, and the direction in parallel to the axis 403 is the second direction. Further, the lens cell area in contact with the optical axis means the area c1 in contact with the optical axis (the intersection point between the axis 402 and the axis 403) among the lens cell areas c1 to c12 of the second lens cell array 4 in FIG. 5. Accordingly, the first group of lens cell areas means the lens cell areas c2, c3, c4, c7, and c10 arranged in the first direction and the second direction with respect to the lens cell area c1.

In the case where the light shielding plates are located at a predetermined rotational position or movement position as the light shielding plates are fully-closed as shown in the embodiment of FIGS. 6A to 6D to 9A to 9D, the shape of the light shielding plates is set in such a manner that the number of the lens cell areas (or the total amount of light passing through the same) which are partially light-shielded (or through which the light partially passes) in the lens cell areas c2 and c3 arranged in the second direction in the first group of lens cell areas is larger than that of the lens cell areas (or the total amount of light passing through the same) which are partially light-shielded (or through which the light partially passes) in the lens cell areas c4, c7 and c10 arranged in the first direction. Accordingly, it is possible to realize high contrast, reduction of uneven image color, and preferable linear characteristics of illuminance changes at the time of rotation.

In the case where the light shielding plates of the light shielding unit are located at a predetermined rotational position or movement position in the projection type display apparatus for displaying an image, a light shielding area of the lens cell area c1 in contact with the optical axis of the second lens array is 50% or less of the lens cell area, and a light shielding area of each lens cell area of the first group of lens cell areas c2, c3, c4, c7 and c10 is 50% or more of the lens cell area. Accordingly, it is possible to realize high contrast as well as reduction of uneven image color, and preferable linear characteristics of illuminance changes at the time of rotation.

Preferably, in the case where the light shielding plates of the light shielding unit are located at a predetermined rotational position or movement position in the projection type display apparatus for displaying an image, a light shielding area of any of the lens cell areas c5, c6, c8, c9, c11, and c12 except for the lens cell area c1 in contact with the optical axis and the first group of lens cell areas c2, c3, c4, c7, and c10 among a plurality of rectangular lens cell areas of the second lens array is larger than that of the lens cell area in contact with the optical axis. Accordingly, it is possible to realize high contrast as well as reduction of uneven image color, and preferable linear characteristics of illuminance changes at the time of rotation.

Furthermore, the second lens array of the projection type display apparatus for displaying an image according to the embodiment of the present invention is arranged in a matrix manner in which the number of lens cells on the upper or lower side of the axis 403 is J (J=4 in the example of FIG. 5 and J is an integer number of 1 or larger) and the number of lens cells on the right or left side of the axis 402 is K (K=3 in the example of FIG. 5 and K is an integer number of 1 or larger). The shape of the light shielding plates is set in such a manner that each of the lens cells has a long rectangular shape in parallel to the direction of the axis 403.

Specifically, the projection type display apparatus for displaying an image according to the embodiment of the present invention includes the light source, the first lens array having a plurality of lens cell areas through which the emission light emitting from the light source passes, the second lens array having a plurality of lens cell areas through which the emission light fluxes from the first lens array pass, the display element which receives the emission light fluxes from the second lens array to pass through or reflect, the projection lens which emits the transmission light or the reflected light from the display element, and the variable aperture stop-down unit which light-shields the light fluxes to the second lens array. A plurality of rectangular lens cell areas of the second lens array are arranged in a matrix manner with upper and lower 2J rows×right and left 2K rows about the optical axis, and the variable aperture stop-down unit has the light shielding plates, and changes a light shielding range of a plurality of rectangular lens cell areas of the second lens array in the right and left directions by rotation or movement of the light shielding plates. In the case where the light shielding plates are located at a predetermined rotational position or movement position, the variable aperture stop-down unit partially opens at least parts of the lens cell areas among a first group of lens cell areas (including the lens cell areas c4, c7, and c10 of FIG. 5) arranged in the upper and lower directions with respect to the four lens cell areas (including the lens cell area c1 of FIG. 5) in contact with the optical axis and a second group of lens cell areas (including the lens cell areas c2 and c3) arranged in the right and left directions with respect to the four lens cell areas in contact with the optical axis. The number of lens cell areas which are partially opened in the first group of lens cell areas is larger than that of lens cell areas which are partially opened in the second group of lens cell areas. Accordingly, it is possible to realize high contrast, reduction of uneven image color, and preferable linear characteristics of illuminance changes at the time of rotation.

Preferably, in the case where the light shielding plates of the variable aperture stop-down unit are located at a predetermined rotational position or movement position in the projection type display apparatus for displaying an image, the variable aperture stop-down unit partially opens the four lens cell areas (four lens cell areas in total including the lens cell area c1, all of which are located line-symmetrically with respect to the perpendicular axis 402 and the horizontal axis 403 in the example of FIG. 5) in contact with the optical axis, 4L (L is an integer number of 1 or larger, and L=3 in the example of FIG. 5) lens cell areas (12 lens cell areas in total including the lens cell areas c4, c7, and c10, all of which are located line-symmetrically with respect to the perpendicular axis 402 and the horizontal axis 403 in the example of FIG. 5) obtained by arranging L lens cell areas adjacent to each of the four lens cell areas in the upper and lower directions, and 4M (M is an integer number of 1 or larger, and M=1 in the example of FIG. 5) lens cell areas (8 lens cell areas in total including the lens cell areas c2 and c3, all of which are located line-symmetrically with respect to the perpendicular axis 402 and the horizontal axis 403 in the example of FIG. 5) obtained by arranging M lens cell areas adjacent to each of the four lens cell areas in the right and left directions. The variable aperture stop-down unit light-shields the other lens cell areas of the second lens array, and the shape of the light shield plates is set in such a manner that L is larger than M.

In other words, by partially opening at least parts of lens cell areas of the second lens array, the value of 4L as the number of cells of the lens cell areas arranged in the upper and lower (the perpendicular axis 402) directions perpendicular to the rotational direction or the movement direction of the light shielding plates with respect to the four lens cell areas in contact with (or encircling the optical axis) the optical axis is larger than the value of 4M as the number of cells of the lens cell areas arranged in the right and left (the horizontal axis 403) directions in parallel to the rotational direction or the movement direction of the light shielding plates with respect to the four lens cell areas in contact with the optical axis.

As described above, by increasing L, the reduction of uneven image color is expected. By increasing M, the improvement of the linear characteristics of illuminance changes at the time of rotation is expected. By decreasing an aperture area as a whole while increasing L larger than M, high contrast is expected. Accordingly, it is possible to realize high contrast, reduction of uneven image color, and preferable linear characteristics of illuminance changes at the time of rotation.

More preferably, in the case where the light shielding plates of the variable aperture stop-down unit are located at a predetermined rotational position or movement position in the projection type display apparatus for displaying an image, the shape of the light shielding plates is set in such a manner that an aperture area of each cell of the four lens cell areas in contact with the optical axis is larger than that of any of the lens cell areas of 2L lens cell areas and 2M lens cell areas. Accordingly, it is possible to realize high contrast as well as reduction of uneven image color, and preferable linear characteristics of illuminance changes at the time of rotation.

More preferably, in the case where the light shielding plates of the light shielding unit are located at a predetermined rotational position or movement position in the projection type display apparatus for displaying an image, the shape of the light shielding plates is set in such a manner that an aperture area of each of the four lens cell areas in contact with the optical axis is 50% or more of the lens cell area, and an aperture area of each of the lens cell areas of the first group of lens cell areas is 50% or less of the lens cell area. Accordingly, it is possible to realize high contrast as well as reduction of uneven image color, and preferable linear characteristics of illuminance changes at the time of rotation.

It should be noted that for example, L is 2 and M is 1 in the projection type display apparatus for displaying an image.

The projection type display apparatus for displaying an image to which the present invention is applied may be any one of a three-plate transmission type, a single-plate transmission type, a three-plate reflection type, and a single-plate reflection type.

Figure 14:
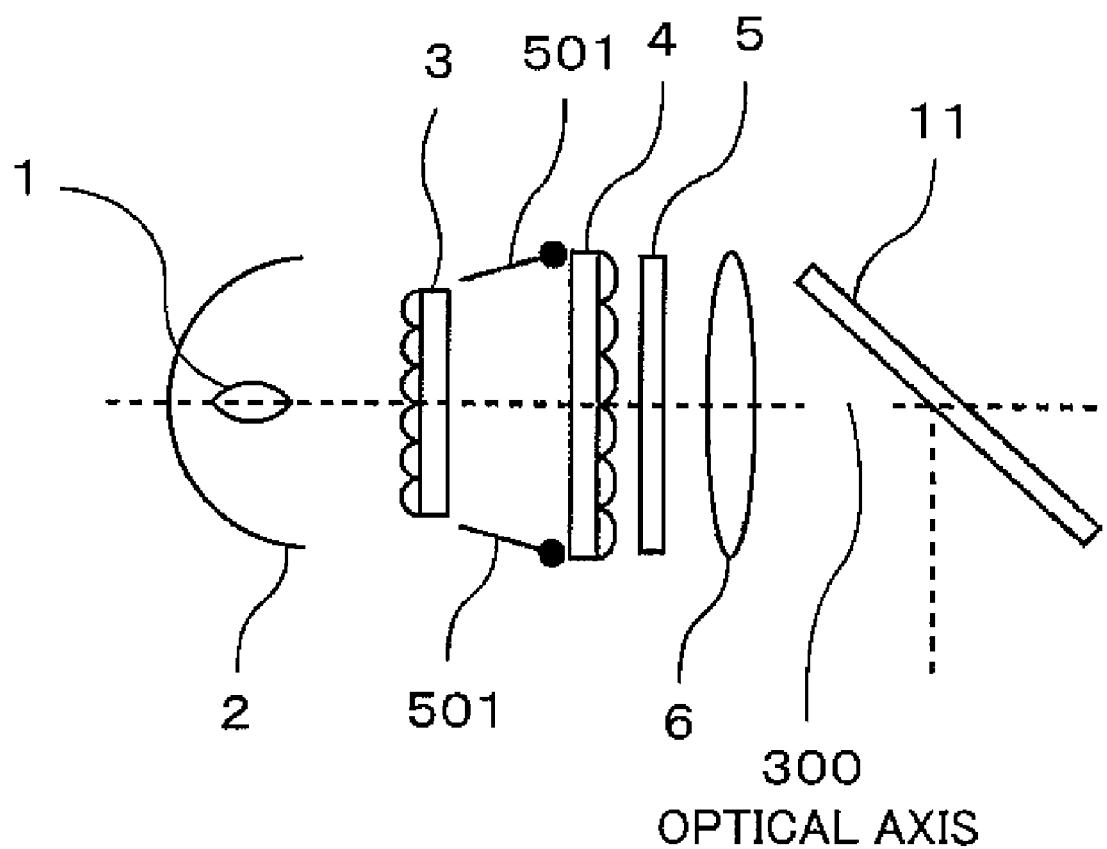
FIG. 14 is a diagram showing the embodiment of the optical system configuration of the projection type display apparatus for displaying an image according to the present invention.

Further, for example, in the embodiment of FIG. 1, the light which is emitted from the light source unit and passes through the first lens array 3, the light shielding unit 501, the second lens array 4, the polarized light converting element 5, and the collecting lens 6 enters the reflecting mirror 7, and then to the following dichroic mirror 11 while changing the direction by 90 degrees. However, as in the embodiment of FIG. 14, the optical axis of the emission light from the collecting lens 6 is provided so as to be in parallel to the optical axis of the dichroic mirror 11, so that the reflecting mirror may be omitted, thus reducing the number of components.

Further, it is obvious that the present invention is not limited to the above-describe examples, but may be configured in various manners without departing from the gist of the present invention.

What is claimed is:

1. A projection type display apparatus for displaying an image, comprising:
    a light source;
    a first lens array having a plurality of lens cell areas by which emission light emitting from the light source is divided into a plurality of light fluxes;
    a second lens array having a plurality of lens cell areas through which the emission light fluxes from the first lens array pass;
    a collecting lens which collects the emission light fluxes from the second lens array;
    a display element which receives the light fluxes collected by the collecting lens to pass through or reflect;
    a projection lens which emits the transmission light or the reflected light from the display element; and
    a light shielding unit which light-shields the light fluxes from the first lens array to the second lens array,
    wherein, a plurality of rectangular lens cell areas of the second lens array are arranged in a matrix manner with upper and lower 2J (J is an integer number of 1 or larger) rows×right and left 2K (K is an integer number of 1 or larger) rows about an optical axis;
    wherein, the light shielding unit light-shields at least parts of all the lens cell areas except for the lens cell area in contact with an optical axis among a first group of lens cell areas obtained by arranging L (L is an integer number of 3 or larger) lens cell areas adjacent to each of the four lens cell areas in an upper and lower directions with respect to the four lens cell areas in contact with the optical axis, and a second group of lens cell areas obtained by arranging M (M is an integer number of 1 or larger) lens cell areas adjacent to each of the four lens cell area in a right and left directions with respect to the four lens cell areas in contact with the optical axis, and a light shielding area in the lens cell area in contact with the optical axis is smaller than that in any of the lens cell areas except for the lens cell area in contact with the optical axis.

2. A projection type display apparatus for displaying an image, comprising:
a light source;
a first lens array having a plurality of lens cell areas by which emission light emitting from the light source is divided into a plurality of light fluxes;
a second lens array having a plurality of lens cell areas through which the emission light fluxes from the first lens array pass;
a collecting lens which collects the emission light fluxes from the second lens array;
a display element which receives the light fluxes collected by the collecting lens to pass through or reflect;
a projection lens which emits the transmission light or the reflected light from the display element; and
a light shielding unit which light-shields the light fluxes from the first lens array to the second lens array,
wherein: a plurality of rectangular lens cell areas of the second lens array are arranged in a matrix manner with upper and lower 2J (J is an integer number of 1 or larger) rows×right and left 2K (K is an integer number of 1 or larger) rows about an optical axis, and the plurality of rectangular lens cell areas of the second lens array are arranged a first group of lens cell areas obtained by arranging L (L is an integer number of 3 or larger) lens cell areas adjacent to each of the four lens cell areas in an upper and lower directions with respect to the four lens cell areas in contact with the optical axis, and a second group of lens cell areas obtained by arranging M (M is an integer number of 1 or larger) lens cell areas adjacent to each of the four lens cell area in a right and left directions with respect to the four lens cell areas in contact with the optical axis;
the light shielding unit has light shielding plates, and light-shields a plurality of rectangular lens cells areas of the second lens array in the first direction by rotation or movement of the light shielding plates; in the case where the light shielding plates are located at a predetermined rotational position or movement position, the light shielding unit partially light-shields at least parts of the lens cell areas among the first group of lens cell areas that are lens cell areas except for the lens cell area in contact with the optical axis of the second lens array and are a plurality of lens cell areas arranged in the first direction and the second direction with respect to the lens cell area in contact with the optical axis; and in the first group of lens cell areas, the number of lens cell areas which are partially light-shielded in the lens cell areas arranged in the second direction is larger than that of the lens cell areas which are partially light-shielded in the lens cell areas arranged in the first direction.

3. The projection type display apparatus for displaying an image according to claim 2, wherein in the case where the light shielding plates of the light shielding unit are located at a predetermined rotational position or movement position, a light shielding area of the lens cell area in contact with the optical axis of the second lens array is smaller than that of any of the lens cell areas of the first group of lens cell areas.

4. The projection type display apparatus for displaying an image according to claim 2, wherein in the case where the light shielding plates of the light shielding unit are located at a predetermined rotational position or movement position, a light shielding area of the lens cell area in contact with the optical axis of the second lens array is 50% or less of the lens cell area, and a light shielding area of each lens cell area of the first group of lens cell areas is 50% or more of the lens cell area.

5. The projection type display apparatus for displaying an image according to claim 2, wherein in the case where the light shielding plates of the light shielding unit are located at a predetermined rotational position or movement position, a light shielding area of any of the lens cell areas except for the lens cell area in contact with the optical axis and the first group of lens cell areas among a plurality of rectangular lens cell areas of the second lens array is larger than that of the lens cell area in contact with the optical axis.

6. A projection type display apparatus for displaying an image, comprising:
a light source;
a first lens array having a plurality of lens cell areas through which emission light emitting from the light source passes;
a second lens array having a plurality of lens cell areas through which the emission light fluxes from the first lens array pass;
a display element which receives the emission light fluxes from the second lens array to pass through or reflect;
a projection lens which emits the transmission light or the reflected light from the display element; and
a variable aperture stop-down unit which light-shields the light fluxes from the first lens array to the second lens array,
wherein: a plurality of rectangular lens cell areas of the second lens array are arranged in a matrix manner with upper and lower 2J (J is an integer number of 1 or larger) rows×right and left 2K (K is an integer number of 1 or larger) rows about an optical axis;
the variable aperture stop-down unit has light shielding plates, and changes a light shielding range of a plurality of rectangular lens cell areas of the second lens array in the right and left directions by rotation or movement of the light shielding plates; in the case where the light shielding plates are located at a predetermined rotational position or movement position, the variable aperture stop-down unit partially opens at least parts of the lens cell areas among a first group of lens cell areas obtained by arranging L (L is an integer number of 3 or larger) lens cell areas adjacent to each of the four lens cell areas in an upper and lower directions with respect to the four lens cell areas in contact with the optical axis, and a second group of lens cell areas obtained by arranging M (M is an integer number of 1 or larger) lens cell areas adjacent to each of the four lens cell area in a right and left directions with respect to the four lens cell areas in contact with the optical axis, and the number of lens cell areas which are partially opened in the first group of lens cell areas is larger than that of lens cell areas which are partially opened in the second group of lens cell areas, and L is larger than M.

7. The projection type display apparatus for displaying an image according to claim 6, wherein in the case where the light shielding plates of the variable aperture stop-down unit are located at a predetermined rotational position or movement position, an aperture area of each cell of the four lens cell areas in contact with the optical axis is larger than that of any of the lens cell areas of 4L lens cell areas and 4M lens cell areas.

8. The projection type display apparatus for displaying an image according to claim 6, wherein in the case where the light shielding plates of the light shielding unit are located at a predetermined rotational position or movement position, an aperture area of each of the four lens cell areas in contact with the optical axis is 50% or more of the lens cell area, and an aperture area of each of the lens cell areas of the first group of lens cell areas is 50% or less of the lens cell area.

* * * * *